> United States Patent Office 3,555,114
Patented Jan. 12, 1971

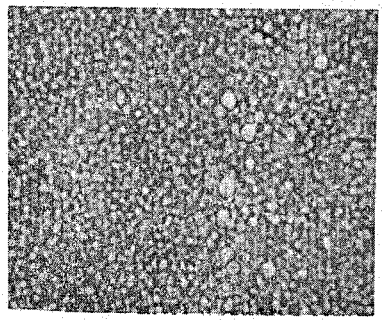
1110x  BLEND A
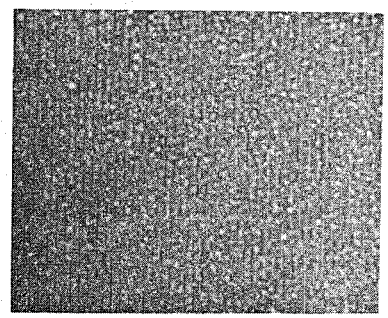
1110x  BLEND B
FIG. 2.
CONDITION AFTER 5 MIN. HEATING AT 280 °C
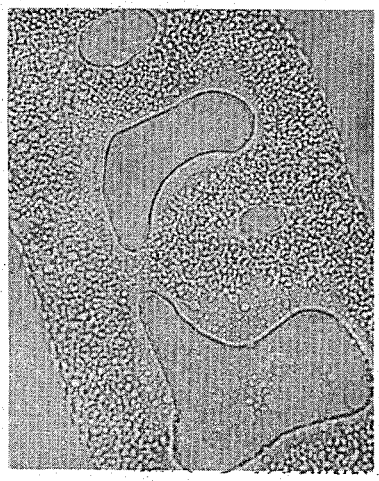
530x  BLEND A
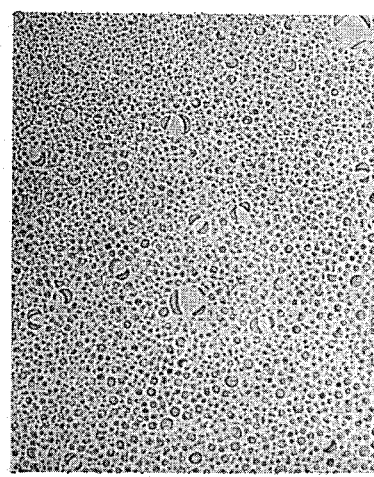
530x  BLEND B
FIG. 3.

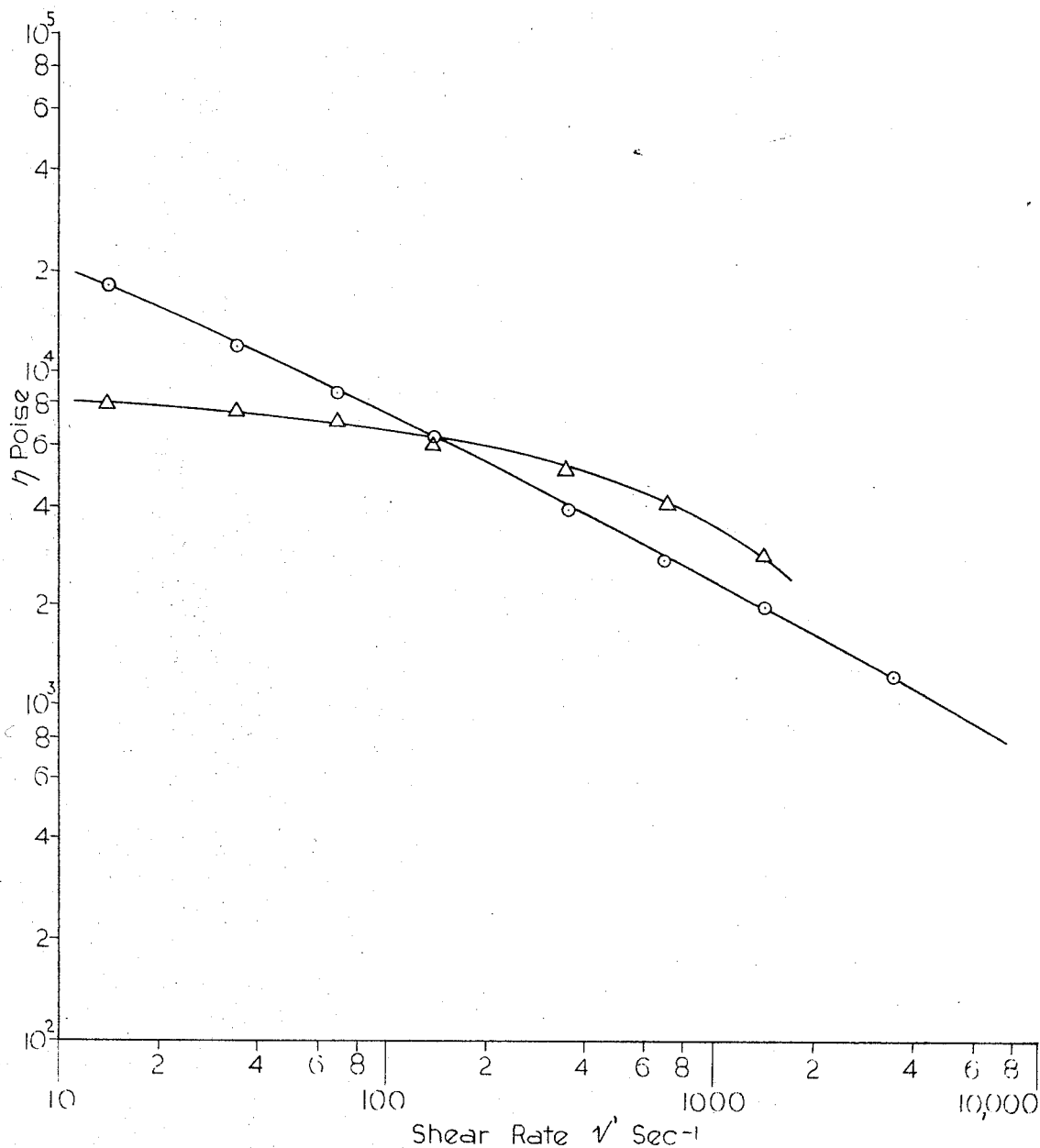

3,555,114
POLYCAPROLACTAM POLYMERIZED
WITH DIETHANOLAMINE
Herbert K. Reimschuessel, Morristown, Gerald J. Dege, Parsippany, and Robert Fuhrmann, Morris Plains, N.J., assignors to Allied Chemical Corporation, New York, N.Y., a corporation of New York
Filed Oct. 11, 1968, Ser. No. 766,691
Int. Cl. C08g 41/04
U.S. Cl. 260—857                          9 Claims

ABSTRACT OF THE DISCLOSURE

The modified polyamides formed by polymerization of E-caprolactam in the presence of diethanolamine, possess numerous advantages over other polyamides. The modified polyamides have excellent dying characteristics in fiber form and excellent printability in film form. When blended with polyesters and/or other polyamides, the composite blend has superior tear properties in comparison with conventional polyester/polyamide composite blends.

FIELD OF THE INVENTION

Figure 1:
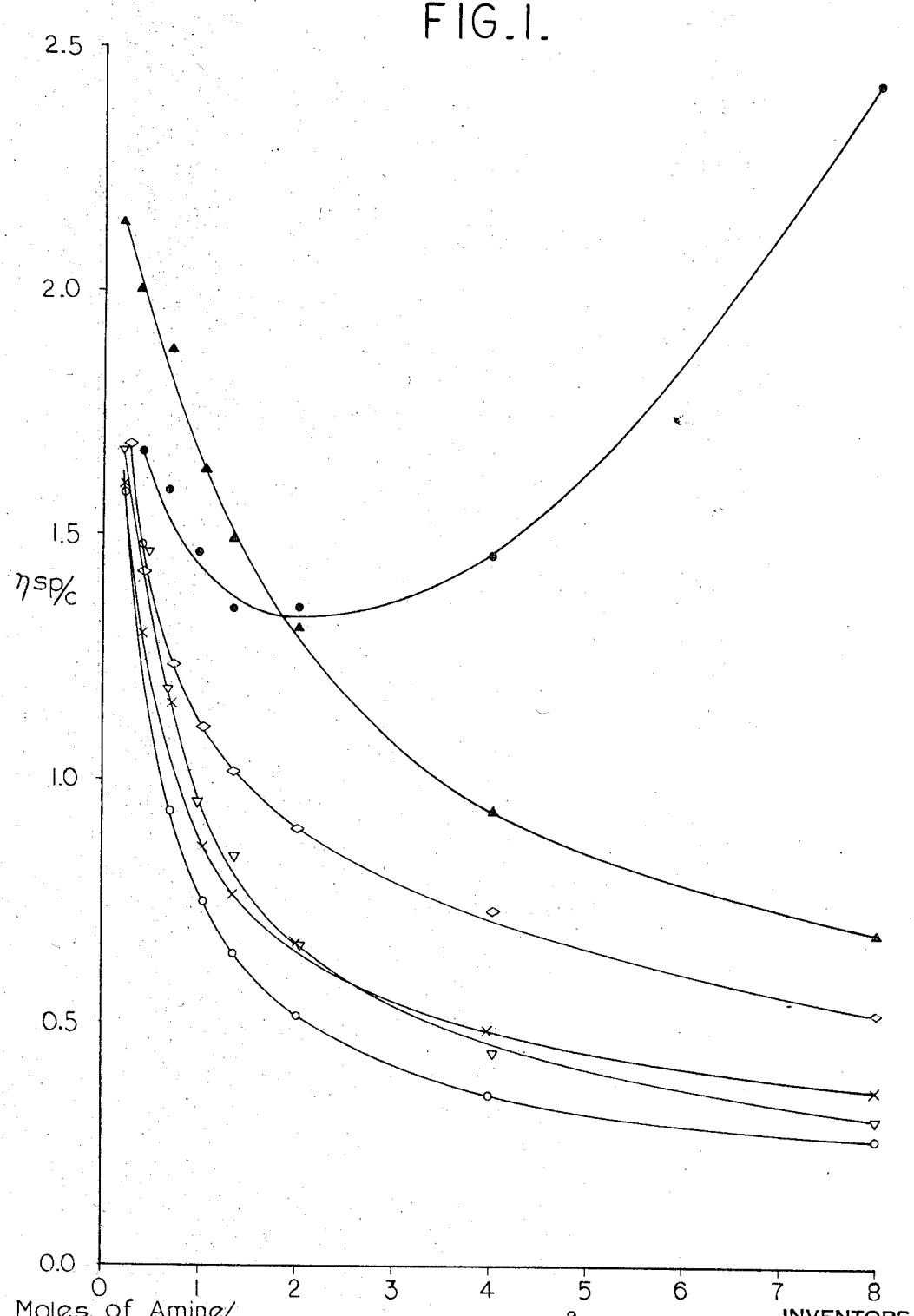

This invention relates to modified polyamides. More particularly, this invention relates to modified polyamides, i.e., nylons, prepared from E-caprolactam. Still more particularly this invention relates to the polymers produced by the polymerization of E-caprolactam in the presence of from 0.1 to 10.0 mole percent diethanol amine.

Polyamides, i.e., nylons, have been known and widely used for many years in a great variety of applications such as fibers, films and molded articles either alone or in combination with other synthetic materials. One of the most widely used nylons is nylon 6, formed by the polymerization of E-caprolactam. Nylon 6 is utilized in the form of fibers, extruded films and cast or molded articles of great variety both as the sole or predominant component of said fibers, films and the like and as an additive component in conjunction with other synthetic polymers such as polyesters.

Notwithstanding its widespread utility and excellent properties in diversified applications, nylon 6 can be modified in accordance with the teaching of the instant invention to improve specified characteristics in particular fields of application.

DESCRIPTION OF THE PRIOR ART

It is known that modified polyamides having improved properties in certain applications can be produced by preparation of the polyamide in the presence of amines or alcohols.

U.S. Pat. No. 2,264,293 describes the production of viscosity stabilized polyamides by heating a polyamide-forming composition in the presence of a hydroxy amine of the formula H₂N—R—OH wherein R is a 2 or 3 carbon divalent alkyl radical.

U.S. Pat. No. 2,524,228 describes the reaction product of E-caprolactam and hydroxy compound of the formula ROH or R'—(OR")₂—OH wherein R' is a hydrocarbon and R" is a divalent aliphatic or aralkyl group.

U.S. Pat. No. 2,526,078 describes the preparation of low-molecular weight polymeric materials by the reaction of equimolar amounts of E-caprolactam and a compound of the formula

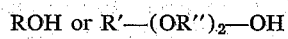

wherein R is hydrogen, alkyl or monohydroxyalkyl.

U.S. Pat. No. 3,197,441 describes the preparation of adhesive polymers by the polymerization of E-caprolactam in the presence of a primary amino alcohol of the formula

wherein R₁ is hydrogen, alkyl or hydroxy alkyl and R is hydroxymethyl.

It is also known that the polymerization of E-caprolactam in the presence of mono- or polyamines affords polyamide wherein a high proportion of the polyamide chains have terminal amino groups rather than terminal carboxyl groups. Such polyamides having terminal amino groups are known to be particularly receptive to dyes. Modified nylons having amino end groups are, in general, more readily incorporated into a compatible blend with other synthetic polymers, e.g. polyesters. However, the percentage of amino group terminated polymer chains is generally directly proportional to the mole ratio of amine to E-caprolactam at the onset of polymerization, i.e., to the quantity of amine present in the E-caprolactam being polymerized. Furthermore, the degree of polymerization of the polymer chains, and, hence, the polymer melt viscosity, is inversely proportional to the mole ratio of amine to E-caprolactam; that is, the greater the amount of amine present along with the E-caprolactam monomer at the onset of polymerization, the lower the melt viscosity of the resulting amine-modified poly-E-caprolactam, i.e., modified nylon 6. Unfortunately, nylon 6 having excessively low melt viscosity is difficult or impossible to suitably process into fibers or films either alone or when combined with other polymers.

The prior art has not taught a convenient and commercially practical means for producing a modified nylon, specifically a modified nylon 6, having both a suitably high melt viscosity and a high concentration of amino end groups so that the modified nylon can be readily processed by conventional methods into deep dying yarns or into films showing superior ink absorption, i.e., "printability."

SUMMARY OF THE INVENTION

It is an object of this invention to provide an amine-modified nylon 6 fiber having superior dying characteristics.

It is a further object of this invention to provide an amine-modified nylon 6 film having superior printability, clarity, and dimensional stability.

It is a still further object of this invention to provide compatible amine-modified nylon-polyester blends that can be formed into films and fibers having improved properties.

Further objects and advantages will become apparent from the description of the invention which follows in greater detail.

It has now been found in accordance with this invention that when E-caprolactam is polymerized in the presence of from 0.1 to 10.0 moles percent diethanolamine, there is produced a modified nylon 6 of high molecular weight having a high percentage of terminal amino groups and a high melt viscosity. The modified nylon 6, prepared in accordance with the instant invention, can be formed by conventional techniques into fibers having improved dyability and into films of improved printability, clarity, and dimensional stability. Likewise, blends of the modified nylon 6 of the instant invention with polyesters and/or polyamides, other than nylon 6, are readily processable into films having improved fibrillation resistance when compared to conventional nylon 6-polyester blend films.

When E-caprolactam is polymerized to afford nylon 6, the polymer chains are generally believed to have essentially the following structure:

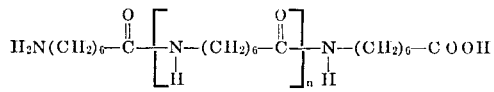

wherein $n$ connotes the degree of polymerization—generally about 100 to 200. As can be seen, the polymer chain end groups are respectively $NH_2$ and $COOH$. However, when E-caprolactam is polymerized in the presence of an amine, e.g., $RNH_2$, it is believed that the polymer chains generally have the structure:

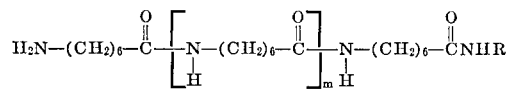

where $m$ likewise connotes the degree of polymerization. However, under such circumstances, as heretofore indicated, conventional amines serve as polymerization chain terminators, and the degree of polymerization and, hence, the melt viscosity, of the amine-modified polyamide is generally significantly reduced, i.e., the degree of polymerization of the modified polyamide is approximately equal to the reciprocal of the mole ratio of amine to E-caprolactam in the initial polymerization charge, and $m$ will be substantially lower than $n$. At amine-E-caprolactam ratios sufficiently high to provide, a high percentage of amine group, i.e.,

terminated polymers, the degree of polymerization, and, hence, the melt viscosity of the resultant polyamide is too low for convenient processing of the amine-terminated nylon 6 by conventional apparatus, e.g., extruders, blow molders, and the like.

In contradistinction to the above, we have discovered that polymerization of E-caprolactam in the presence of 0.1 to 10.0 mole percent of diethanolamine, preferably 0.3 to 5.0 mole percent, affords a modified nylon 6 having both a high percentage of terminal amino groups and a high melt viscosity. The high melt viscosity of the modified polyamide of the instant invention insures that our polyamide is readily processable utilizing conventional nylon handling equipment. To the best of our knowledge, this ability to modify nylon 6 in the above-indicated beneficial fashion is uniquely possessed by diethanolamine. Even other closely related amines such as diethylamine or mono- or triethanolamine, or a mixture thereof, do not achieve the same results.

The diethanolamine-modified nylon 6 of the instant invention possesses numerous additional advantages over both unmodified nylon 6 and/or conventional amine-modified nylon 6.

(1) Fiber prepared by extrusion of the modified nylon 6 of the instant invention dyes much deeper, i.e., absorbs dye more rapidly, and acquires a more pronounced tone than conventional nylon 6 fibers of approximately the same denier and melt viscosity.

(2) Films prepared by extrusion from a melt of our modified nylon 6 show high gloss and have improved clarity as compared with conventional nylon 6 film. Furthermore, our modified nylon 6 film shows superior thermoforming characteristics in that it does not show "line drawing" or have milky or hazy areas such as is frequently encountered with conventional nylon 6 films.

(3) Nylon 6 can exist in any one of three crystal forms: amorphous, $\gamma$ (pseudo hexagonal) or $\alpha$ (monoclinic). The $\alpha$-form shows superior dimensional stability over the other forms. It is conventional to anneal, i.e., to heat treat, conventional nylon 6 film to increase the percentage of the nylon polymer molecules that are in the $\alpha$-form since nylon 6, with this crystalline structure, exhibits superior dimensional stability in comparison with the other crystalline forms. Unfortunately, when conventional nylon 6 or conventional amine-modified nylon 6 film is annealed, as by steam treatment, the film generally develops some hazy areas. However, when film prepared from nylon 6, modified in accordance with the present invention, is steam annealed, not only is a substantially greater degree of transformation of the nylon into the $\alpha$-form achieved, but nevertheless the film retains its original clarity. Both significant conversion to the $\alpha$-form and retention of clarity have not been achieved by annealing of conventional nylon 6 film to the best of our knowledge.

(4) Melt blends of polyester and/or polyamides such as conventional nylon 6 with the modified nylon 6 of the instant invention show less tendency towards phase separation than melt blends of conventional nylon 6 and/or conventionally modified nylon 6 and polyesters. The reduced phase separation in the melt results in molded, extruded or fibrous nylon/polyester blend materials of improved homogeneity and physical and chemical properties. In particular, superior tensile modulus, tear resistance and improved heat stability, which is of particular importance for easy processing, are obtained with the diethanolamine-modified nylon 6/polyester blends of the instant invention.

As heretofore indicated, the superior, novel modified nylon 6 polymers of the instant invention are prepared by polymerization of a mixture of E-caprolactam with from 0.1 to 10.0 mole percent of diethanolamine.

Any of the conventional procedures utilized for the polymerization of E-caprolactam to nylon 6 can suitably be employed to prepare the diethanolamine-modified nylon 6 of our invention. A preferred method involves addition of the amine modifier in an amount within the above-indicated suitable range of 0.1 to 10.0 mole percent, preferably 0.3 to 5.0 mole percent, to an oxygen-free molten mixture of E-caprolactam, plus polymerization catalyst, under a nitrogen atmosphere. Suitable known catalysts include, for example, water, mineral and organic acids, amino carboxylic acids, amine salts of inorganic acids, metal phosphates, and phosphites, and the like. The ratio of catalyst to E-caprolactam is suitably from about 1:20 to about 1:300. The diethanolamine, catalyst and E-caprolactam mixture is then polymerized by heating for a period of 5 to 50 hours, preferably 12 to 24 hours, at a temperature ranging from about 200° to about 300° C., preferably 220° to 270° C., preferably under an inert atmosphere.

The thereby resulting diethanolamine-modified nylon 6 polymers of the instant invention can be formed into fibers, films, and the like, by conventional nylon 6 processing methods, e.g., extrusion through an appropriately shaped orifice at a temperature of 240° C. to 290° C. followed by quenching to ambient temperature.

After formation by extrusion from the melt, nylon 6 film is generally annealed to convert as much as possible of the nylon 6 into the $\alpha$-form and thereby increase the dimensional stability of the film. Such annealing can be carried out by dry-heat treatment or, preferably, by spraying the film with saturated steam.

As heretofore indicated, composite blends comprising nylon 6 and one or more other synthetic polymers are widely used in a number of applications. Particularly useful composite blends are those containing from about 20% to 80% nylon 6 and correspondingly about 80 to 20 weight percent of a polyester derived from an aromatic dicarboxylic acid such as polyethylene terephthalate. Also useful are composite blends of nylon 6 with one or more nylons other than nylon 6 such as nylon 66, 612, 7, 11, 12 and meta-xylene diamine diadipate. Such composite blends can be prepared by simple melt blending of the nylon 6 and polyester or nylon 6 and other nylons. Such composite blends can be formed into fibers, films, etc., using the same hitherto enumerated techniques applicable to nylon 6 alone.

The nylon 6 component of the nylon 6/polyester or nylon 6/other nylon blends with which the instant invention is concerned as described above can consist entirely of the diethanolamine-modified nylon 6 of the instant invention or preferably a mixture of conventional nylon 6 and diethanolamine-modified nylon 6, hereinafter referred to as "DEA nylon 6." Most preferably the nylon 6 component of a composite blend will contain from 3 to 25 weight percent DEA nylon 6 and correspondingly from 97 to 75 weight percent conventional nylon 6.

In preparing such composite blends, it is most preferable to prepare a homogeneous melt blend of DEA nylon 6 and polyester or DEA nylon 6 and other nylon and then add the conventional nylon 6 component and thereafter form a homogeneous melt blend of all the components.

The invention can be more fully understood by reference to the following examples taken in conjunction with FIGS. 1–4.

EXAMPLE 1

A series of mixtures of E-caprolactam and a single amine were polymerized using a variety of amines to thereby afford nylon 6 modified with different amines by heating the amine and E-caprolactam mixture for 22 hours at 255° C. under a dry nitrogen atmosphere using 0.01 mole percent, based on E-caprolactam, of amino caproic acid as catalyst. Samples of nylon 6 modified with varying amounts of each one of the following amines were produced: diethanolamine, morpholine, diethylene triamine, ethanolamine, 1,1' - imino-di-2-propanol, and diglycolamine.

FIG. 1 indicates the reduced viscosities obtained on the modified nylon 6 for varying amounts of modifying amine. The viscosities were determined at 25° C. in an Ubbelohde viscosimeter using solutions containing 0.52 gram of amine-modified nylon 6 per 100 ml. of metacresol. As can be seen by an examination of FIG. 1, except in the case of diethanolamine, the viscosity of the amine-modified nylon 6 decreases, essentially asymtotically, as the amount of modifier amine present increases. Diethanolamine, however, shows a unique effect. As the amount thereof incorporated increases, there is a steady increase in the modified nylon 6 viscosity after a slight initial drop. Other amines, not shown in FIG. 1, but which were also found to cause a decrease in the viscosity of the amine-modified nylon 6 with amine content, include 2-(2-aminoethylamino)-ethanol, diethylamine, triethanolamine and 2-amino-(2-hydroxy-methyl)-1,3-propanediol.

EXAMPLE 2

A 70/30 blend of nylon 6/polyethylene terephthalate (PET) was made by melt blending 7 parts to 3 parts by weight of these two constituents at 250°–285° C. and then cooling to ambient temperature, milling, water extracting, and vacuum drying the product (Blend A). A second 70/30 nylon 6/PET blend was prepared by first homogeneously melt blending 30 parts of PET with 5 parts of nylon 6 modified with 2.0 mol percent diethanolamine prepared in accordance with the procedure of Example 1. An additional 65 parts of unmodified nylon 6 was then added, and the entire melt blend cooled to ambient temperature to thereby afford a blend containing 65 parts nylon 6, 5 parts DEA nylon 6 and 30 parts PET (Blend B). FIG. 2 shows a 1110-times magnification photomicrograph of blends A and B at room temperature. FIG. 3 shows the same two blends after heating 5 minutes at 280° C. As can be seen from FIG. 2, the blend containing 5% DEA nylon 6 is substantially more homogeneous at room temperature, and also, as shown in FIG. 3, after heating which retention of homogeneity on heating is particularly desirable in achieving a product which is amenable to processing from the melt. The convenional nylon 6/polyester blend has undergone substantially complete phase separation after the 5-minute heating period.

EXAMPLE 3

A 100-pound batch of DEA nylon 6 was prepared using a scale-up of the polymerization procedure described in Example 1. The mole ratio of diethanolamine to E-caprolactam was 1:50, i.e., a 2.0 mol percent DEA nylon 6 was prepared. FIG. 4 shows the melt viscosity behavior of this modified nylon 6 in comparision with conventional nylon 6. As is apparent, the DEA nylon 6 of the instant invention shows a virtually straight line decrease in viscosity with increasing shear rate completely unlike conventional nylon 6. Such straight line melt viscosity behavior is most advantageous in blow molding, extrusion, and similar operations.

A comparison of the properties of extruded film fabricated from conventional nylon 6 and DEA nylon 6 prepared above showed the DEA nylon 6 film to be substantially equivalent to conventional nylon 6 in tensile strength and modulus, yield strength, elongation, Muller burst strength, Elmendorf tear strength, shrinkage, and oxygen, carbon dioxide and water permeability.

The DEA nylon 6 film obtained by extrusion from the melt at 245° C. was also compared with conventional nylon 6 film for printability, adherability, formability, haze, and gloss.

Part A.—Printability

Two inks, "Gemglo" having a nitrocellulose shellac blend base and "Flexogen" having a modified nitrocellulose base, were applied to film samples using an Anilox Hand Proofer (a standard ink evaluation tool). The inked film was air-dried at room temperature and Scotch tape No. 610 applied to the inked film and then removed with a sharp, 180-degree peelback. The DEA nylon 6 film retained 90–100% of the applied ink. The conventional nylon 6 film retained less than 1%.

Part B.—Adherability

In determining the adherability of the film to itself using an adhesive (such as is required for flexible packaging), samples of DEA and conventional nylon 6 film were tested with a synthetic rubber adhesive. The test results were measured in pounds per linear unit of width using a 180-degree peelback and 12 in./min. separation on an Instron Tester. The value for the conventional nylon 6 was 1.12 lbs., while for the DEA nylon 6 it was 2.46 lbs.—over twice as great.

Part C.—Fromability

While numerical values are not obtainable, the DEA nylon 6 film was clearly superior to conventional nylon 6 film in clarity, freedom from "line drawing," milkiness, and haze. The term "line drawing" refers to the phenomenon of discontinuity of rate of gauge diminution across the area being heat drawn. The film may thin out normally in one area while an adjacent area shows no thin-out whatever.

EXAMPLE 4

The DEA nylon 6 film, prepared as in Example 3, and conventional nylon 6 extruded film were steam annealed so as to increase the percentage of polymer in the $\alpha$-crystalline form. As obtained from the extruder, neither type of nylon film had any $\alpha$-form present. All polymer was in the $\gamma$-form or amorphous. Results are tabulated below.

| Duration of steam annealing (min.) | DEA nylon 6 | | Conventional nylon 6 | |
|---|---|---|---|---|
| | Percent $\alpha$-form | Percent $\gamma$-form | Percent $\alpha$-form | Percent $\gamma$-form |
| 0 | 0 | 15 | 0 | 23 |
| 1 | 12 | 12 | 1 | 20 |
| 2 | | | 6 | 19 |
| 5 | | | 10 | 15 |
| 120 | 33 | 0 | 16 | 1 |

The total of $\alpha$-form plus $\gamma$-form plus amorphous equals 100% in all cases.

As can be seen, the DEA nylon 6 film is much more rapidly, and to a greater extent, transformed into the preferred α-form than conventional nylon 6 film. Additionally, even after the 120-minute steam annealing treatment, the DEA nylon 6 film was completely clear, but the conventional nylon 6 film showed appreciable haziness.

EXAMPLE 5

Dyability

Extruded monofilaments of both conventional nylon 6 and 2.0 mole percent DEA nylon 6, as prepared in Example 3, were immersed in a 0.5% Keton Fast Blue aqueous dye solution, buffered to a pH of 5.0 and held at 100° C. for 15 minutes. After 15 minutes, all dyestuff was exhausted. The DEA nylon 6 filament was substantially darker in hue than the conventional nylon 6 filament.

Dyability—Part B

Extruded film samples 5-mil thick of conventional nylon 6 and 2.0 mole percent DEA nylon 6 were immersed in two 0.5% Keton Fast Blue aqueous dye solutions held at 100° C. for 15 minutes. One solution was unbuffered and the other buffered to a pH of 5.0. Only the buffered dye solution was exhausted after 15 minutes; however, in both solutions the DEA nylon 6 absorbed a substantially greater portion of the dyestuff than the conventional nylon 6.

EXAMPLE 6

Films, 4-mil thick, were prepared by extrusion of a 70/30 melt blend of conventional nylon 6-polyethylene terephthalate and a 70/30 nylon 6/polyethylene terephthalate blend wherein the nylon 6 component contained about 4.0 weight percent of a 2 mole percent DEA nylon 6. The first blend had a Graves tear value of 370 lb./in. in the direction transverse to the film draw direction and just under 5000 lb./in. in the direction of the draw. The DEA nylon 6-containing blend had an approximately equal Graves tear value in the film draw direction but a transverse Graves tear value almost 5 times as great (1830 lb./in.). This increase in tear strength is quite exceptional.

Various modifications will be apparent to one skilled in the art, and it is not intended that this invention be limited to the details in the specific examples presented by way of illustration. Accordingly, the scope of the invention is limited only by the appended claims.

We claim:
1. A fiber forming modified polycaprolactam formed by the polymerization of E-caprolactam in the presence of from about 0.1 to about 10.0 mole percent diethanolamine.
2. The modified polycaprolactam of claim 1, wherein the mole percentage of diethanolamine ranges from about 0.3 to about 5.0.
3. Fiber of improved dyability produced by extrusion of the polymer of claim 1.
4. Film produced by extrusion from a melt of the modified polycaprolactam of claim 1.
5. Film containing an increased percentage of a crystalline-form modified polycaprolactam produced by steam annealing the film of claim 4.
6. A composition of matter comprising a substantially homogeneous mixture containing from about 20 to about 80 weight percent of a polyester of an aromatic dicarboxylic acid and an aliphatic glycol and correspondingly from about 80 to about 20 weight percent of nylon 6 wherein at least about 5.0 weight percent of said polycaprolactam is the modified nylon 6 of claim 1.
7. A composition in accordance with claim 6 wherein from about 3.0 to about 25.0 weight percent of said polycaprolactam is the modified nylon 6 of claim 1.
8. Fiber produced by extrusion of the mixture of claim 6.
9. Film produced by extrusion from a melt of the mixture of claim 6.

References Cited

UNITED STATES PATENTS

| | | | |
|---|---|---|---|
| 2,264,293 | 12/1941 | Brubaker | 260—78 |
| 2,524,228 | 10/1950 | Kropa | 260—78 |
| 2,526,078 | 10/1950 | Kropa | 260—78 |
| 3,168,498 | 2/1965 | Runge | 260—78 |
| 3,160,611 | 12/1964 | Runge | 260—78 |
| 3,197,441 | 7/1965 | Wehrmeister | 260—78 |
| 3,369,057 | 2/1968 | Twilley | 260—857 |
| 3,378,602 | 4/1968 | Robertson | 260—857 |
| 3,382,305 | 5/1968 | Breen | 260—857 |

PAUL LIEBERMAN, Primary Examiner

U.S. Cl. X.R.

260—37, 40, 78; 106—26; 161—188, 227